United States Patent
Lugt (10) Patent No.: US 7,389,666 B2
(45) Date of Patent: Jun. 24, 2008

(54) METHOD FOR TREATING THE SURFACE OF A MACHINE ELEMENT

(75) Inventor: Pieter Martin Lugt, Vianen (NL)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/555,776

(22) PCT Filed: May 5, 2004

(86) PCT No.: PCT/NL2004/000303

§ 371 (c)(1),
(2), (4) Date: Apr. 14, 2006

(87) PCT Pub. No.: WO2004/099451

PCT Pub. Date: Nov. 18, 2004

(65) Prior Publication Data

US 2006/0207306 A1 Sep. 21, 2006

(30) Foreign Application Priority Data

May 5, 2003 (NL) .................................. 1023342

(51) Int. Cl.
*B21D 19/04* (2006.01)
(52) U.S. Cl. ................. 72/70; 72/75; 29/90.01
(58) Field of Classification Search ........... 72/70, 72/71, 75, 198; 29/90.01; 451/50, 55, 57
See application file for complete search history.

(56) References Cited

U.S. PATENT DOCUMENTS

| 1,360,558 | A | * | 11/1920 | Mattsson | 29/90.01 |
| 3,049,788 | A | * | 8/1962 | Martin | 29/90.01 |
| 3,587,269 | A | * | 6/1971 | Seccombe | 72/75 |
| 5,339,523 | A | * | 8/1994 | Hasegawa | 29/898.02 |
| 5,931,038 | A | * | 8/1999 | Higashi | 72/70 |
| 6,543,139 | B2 | * | 4/2003 | Usui | 29/898.13 |
| 6,622,570 | B1 | * | 9/2003 | Prevey, III | 73/826 |
| 2003/0176152 | A1 | * | 9/2003 | Lugt et al. | 451/57 |

FOREIGN PATENT DOCUMENTS

WO   WO 03/095855   11/2003

OTHER PUBLICATIONS

Patent Abstracts of Japan, vol. 014, No. 473 (M-1035), Oct. 16, 1990 & JP 02 190259 A (Nippon Seiko KK), Jul. 26, 1990 abstract.

* cited by examiner

*Primary Examiner*—Edward Tolan
(74) *Attorney, Agent, or Firm*—Young & Thompson (57) ABSTRACT

A method for treating the surface of a machine element, such as the raceway and/or a rolling element of a rolling element bearing, comprising the steps of—subjecting the surface to a hard turning operation so as to obtain a specific roughness profile having a series of alternating ridges and grooves,—after the hard turning operation subjecting the surface to a ball calendering operation so as to flatten the ridges of the roughness profile whereby a Δq value smaller than 5° is obtained.

13 Claims, 8 Drawing Sheets

Wave characteristic, Ampl.=0,5 micron, 2,5 Gpa, Von Mises stress (MPa)

METHOD FOR TREATING THE SURFACE OF A MACHINE ELEMENT

The invention is related to the field of finishing highly loaded surfaces of machine elements. As an example of such machine elements, reference is made to rolling element bearings, camshafts and gears. These elements are usually lubricated so as to provide the desired separation between e.g. the balls and the raceways of a bearing.

As a result of recent developments however, the lubrication conditions of such machine elements appear to become less and less ideal. The worsened lubrication conditions are first of all caused by the trend to reduce the viscosity of the lubricant so as to reduce frictional losses. Furthermore, there is a trend to replace oil lubrication by grease lubrication with the aim of reducing maintenance costs. Both trends tend to decrease the film thickness of the lubricant during service.

These developments have raised the importance of surface engineering. In particular, a surface such as the raceway of a bearing ring, or the surface of a rolling element should be treated in such a way that a prolonged operation under very thin film conditions should be possible. The highly loaded surfaces should have a good resistance against local metal to metal contact so as to avoid smearing and/or galling and/or micropitting. Moreover, running-in phenomena should be avoided and the fatigue properties should be excellent.

The object of the invention is therefore to provide a finishing for highly loaded surfaces which satisfies these demands. That object is achieved by a method for treating the surface of a machine element, such as the raceway of a rolling element bearing, comprising the steps of:

subjecting the surface to a hard turning operation so as to obtain a specific roughness profile having a series of alternating ridges and grooves, after the hard turning operation subjecting the surface to a ball calendering operation so as to flatten the ridges of the roughness profile whereby a $\Delta q$ value smaller than 5° is obtained. Preferably, the $\Delta q$ value obtained is smaller than 2°, and greater than 1°.

By means of the hard turning process, which is known per se, a saw teeth like profile is obtained on the surface in first machining operation. By the subsequent ball calendering process, which is also known per se, said saw teeth like profile is flattened. Thereby, the peaks generally obtain about equal heights, which provides a generally sinusoidal shape and a proportioning of the surface. At the same time, the compression of the surface material as caused by the ball calendering process, causes a strengthening effect.

The method according to the invention is thus suitable for obtaining a sinusoidal-like surface. In this connecting, said method can comprise the step of carrying out the hard turning operation and the ball calendering operation at the same feed rate.

The speed of feeding the cutting tool and the speed of feeding the ball calendering tool are selected the same in relation to the rotational speed of the machine element. As a result, the structure of the surface obtained by the hard cutting operation is largely maintained, be it that the sharp peaks and valleys which result from the hard cutting operation are smoothened and brought in a sinusoidal-like shape.

In particular the method according to the invention can comprise the steps of rotating the machine element about an axis thereof, moving a hard turning cutting tool along the surface of the rotating machine element parallel to the axis so as to carry out a cutting operation, selecting a specific ratio of translational speed of the hard turning cutting tool and the rotational speed of the machine element, subsequently moving a ball calendering tool along the surface of the rotating hard cut machine element parallel to the axis so as to carry out a ball calendering operation, selecting a specific ratio of the translational speed of the ball calendering tool and the rotational speed of the machine element while carrying out the cutting operation which is the same as the specific ratio of the translational speed of the hard turning cutting tool and the rotational speed of the machine element while carrying out the cutting operation.

The method according to the invention thus provides a greatly improved surface finish to the element in question. The ball calendering process can be carried out directly after the hard turning process in a single production run, whereby a cost effective operation is ascertained. It appears that the machine elements thus obtained have an improved subsurface stress distribution, leading to a better smearing, scuffing and fatigue resistance. Moreover, running in and separation properties are improved as well. In fact, these properties appear to be about the same as a mathematically smooth surface.

The ball calendering operation is preferably carried out by means of a ceramic ball, e.g. from silicon nitride $Si_3N_4$. Said ball may have a diameter of 2 to 13 mm. The pressure applied by the ball on the surface may amount to a value from 50 to 400 bar.

The residual subsurface compressive stresses obtained may amount to maximally 800 MPa. The area with compressive stresses may extend up to a depth of 500 micrometer under the surface. These properties lead to improved fatigue resistance.

Preferably, a ball calendering tool is applied in which the ball is supported through a pressure medium the hydrostatic pressure of which ranges from 50 bar to 400 bar.

The invention will now be described further with reference to the figures.

As discussed before the invention is related to the field of finishing highly loaded surfaces, for instance of rolling element bearings etc. In the contact between the rolling element and the surface of a ring, a Hertzian contact exists. Table 1 shows simple Hertzian contact calculations of a ceramic ball on a steel fat surface, whereby the ball size and the pressure are varied.

TABLE 1

| pressure (bar) | 3 mm ball | | 6 mm ball | |
|---|---|---|---|---|
| | Pmax (GPa) | $Z_o$ (μm) | Pmax (GPa) | $Z_o$ (μm) |
| 50 | 5.7 | 25 | 5.7 | 51 |
| 100 | 7.2 | 32 | 7.2 | 64 |
| 150 | 8.2 | 37 | 8.2 | 73 |
| 200 | 9.0 | 40 | 9 | 81 |
| 300 | 10.3 | 46 | 10.3 | 92 |

Plastic deformation occurs when the maximum contact stress $P_{max}$ reaches 1.8Y, where Y is the use stress in simple tension. The table shows that plastic deformation on smooth surfaces will occur already at a pressure of 50 bar. Any roughness feature will therefore surely be deformed plastically under such high pressures as well. Therefore, the ball calendering process, already at a very low pressure of 50 bars, changes the surface by plastic deformation.

Figure 1:
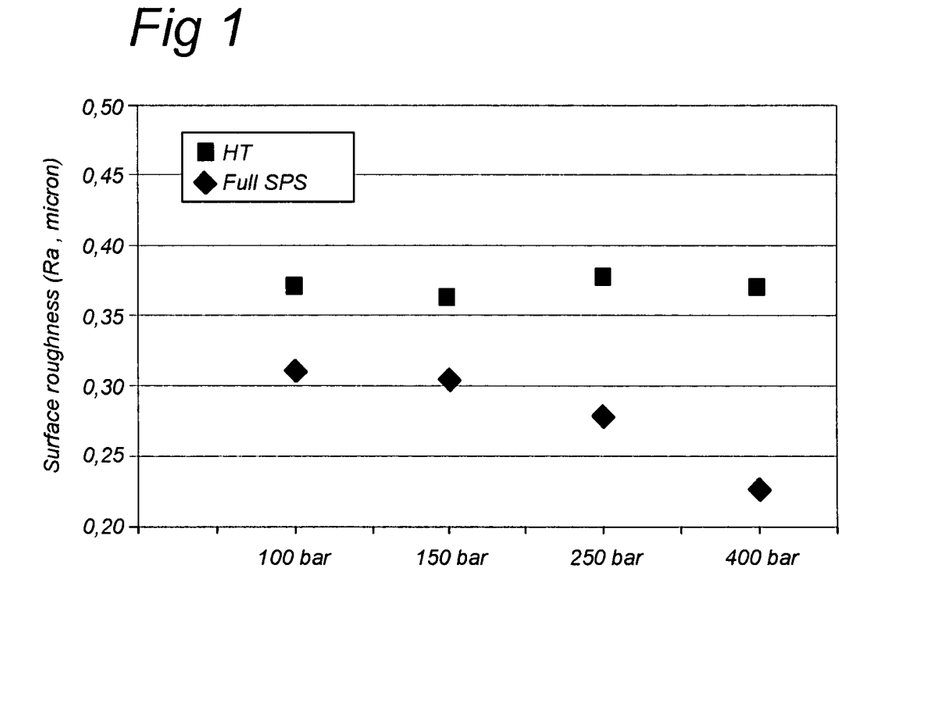
FIG. 1 shows a graph containing the reduction of the roughness obtained by the ball calendering process, versus the pressure applied during the ball calendering process.

FIG. 1 shows the effect of pressure on the Ra values. A hardened steel disc was subjected by a ball calendering process carried out by means of a 6 mm ball and a feed rate of 0.05 mm per revolution. The ball calendering pressure was varied from 100 to 300 bars. Both before and after the ball calendering process surface roughness measurements were performed at practically the same spot. From FIG. 1 it is clear that the Ra values are reduced with some 20 to 70%.

Figure 2:
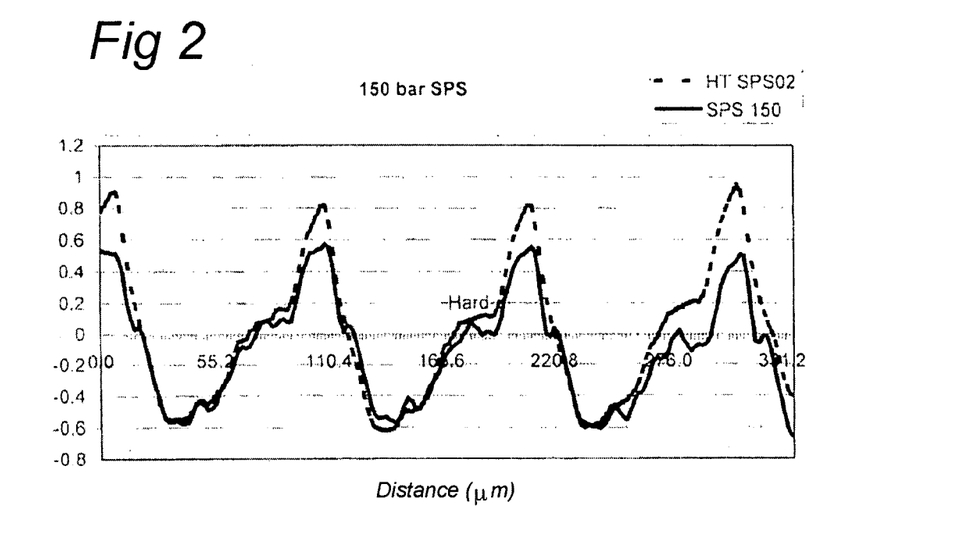
FIGS. 2 and 3 show the changes in surface height from hard turning with a 6 mm ball, at respectively 150 and 400 bar pressure.

Futhermore, the changes in surface topography have been investigated, both before and after applying the ball calendering process. By means of an optical profilometer, the surfaces have been plotted. FIG. 2 shows the average profile across the running direction. The measurements have been matched such that both measurements are in face.

Figure 3:
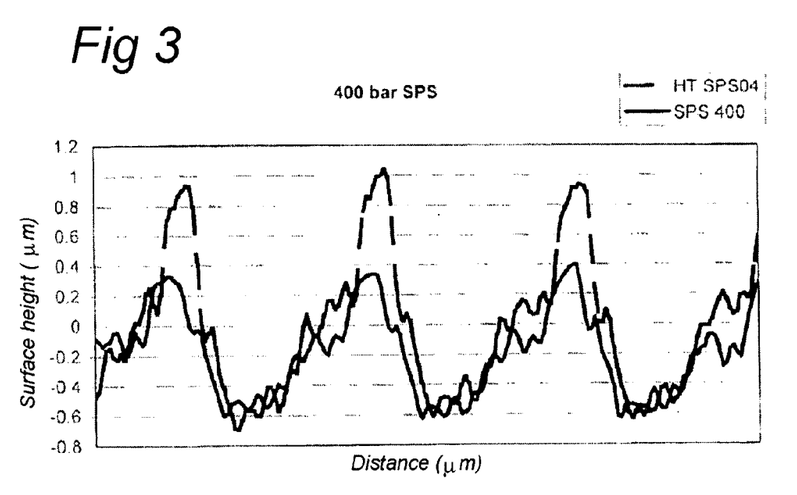

FIG. 3 shows the results of the same set of measurements, applied to a surface structure wherein a pressure of 400 bar has been applied during the ball calendering process. Both figures show the effect that ball calendering has on the real surface height. Plastic deformation reduces the sharp saw-teeth structure, thus making it more flat. As a result, a more or less sinusoidal surface structure is obtained. It is should be noted that the reference line for the surface height for the deformed surfaces have been chosen such that the deformed and undeformed surfaces match in the valleys of the roughness of FIG. 3.

Figure 4:
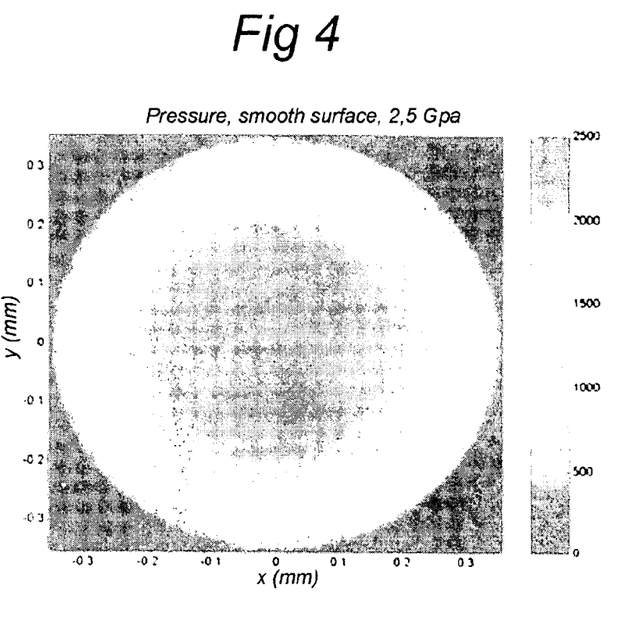
FIG. 4 shows a top view of the ideal Hertzian pressure distribution for a smooth surface.
Figure 5:
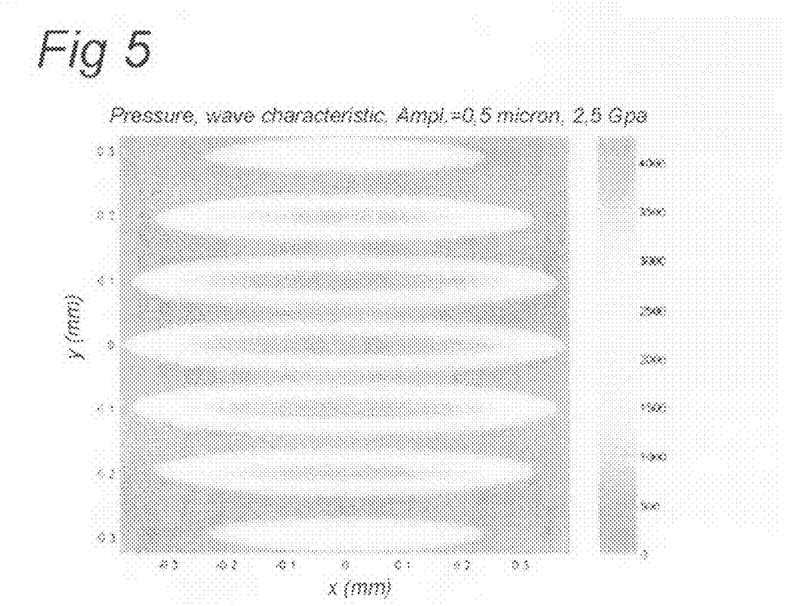
FIG. 5 shows a similar stress distribution but for a surface obtained according to the invention.

Consequently, the ideal hard turned and subsequently ball calendered surface (hereafter also referred to as a surface proportioned and strengthened (SPS) surface) has a longitudinal sinusoidal microstructure. The effect of such surface on life has been investigated, in that calculations have been performed on such idealised surface structures. By means of multigrid techniques the surface and sub-surface stresses have been calculated. Examples of the pressure and subsurface stresses are given in FIGS. 4 and 5 (top view) and 6 and 7 (cross sectional view) for a smooth and an idealised surface structure obtained with the ball calendering process.

Furthermore, the fatigue life has been calculated, the results of which calculation are given in table 2.

TABLE 2

| Load | roughness (microns) | L10 (normalised) |
|---|---|---|
| 2.5 GPa | smooth | 0.000525 |
| | Ra = 0.32 | 0.000773 |
| | Ra = 0.64 | 0.000135 |
| 2.0 GPa | smooth | 0.0210 |
| | Ra = 0.032 | 0.0391 |
| | Ra = 0.64 | 0.000429 |
| 1.6 GPa | smooth | 1.00 |
| | Ra = 0.32 | 0.792 |
| | Ra = 0.64 | 0.00160 |

Table 2 gives the life calculations for a ball calendered surface related to a bearing type of contact where the ball is loaded in such a way that the maximum Hertzian stresses are 2, 5, 2.0 and 1.6 GPa respectively. From table 2 it is clear that the life for the rough surface is larger than the life of the corresponding mathematical smooth surface.

From calculations it has become clear that the main contribution to fatigue life reduction is caused by the part of the structure which lies somewhat deeper under the surface thereof. After applying the ball calendering process the risk for failure by overrolling is rather high just under the surface, at a relatively small depth. This is clear from FIG. 7. Said FIG. 7 shows that the load applied by the ball is mainly carried by the asperity ridges. The stresses are here much higher than in the smooth embodiment of the structure as given in FIG. 6. Consequently, in the ball calendered surface according to FIG. 7 the sub-surface stresses close to the surface are higher, which would result in a reduction of the fatigue life. The pressure in the valleys is very often zero. This is not surprising: surface reference creates stresses at and just under the surface, generally resulting in a reduction of life.

In the present case of a hard turned and subsequently ball calendered SPS surface this effect is limited by the fact that the stress perturbations on the Hertzian stress distribution are nicely proportioned. Thus, no extreme high pressures occur. The roughness peaks all show equal height and the load is well distributed over all asperities ridges. This results in a reduced life reduction of the SPS surface.

Figure 6:
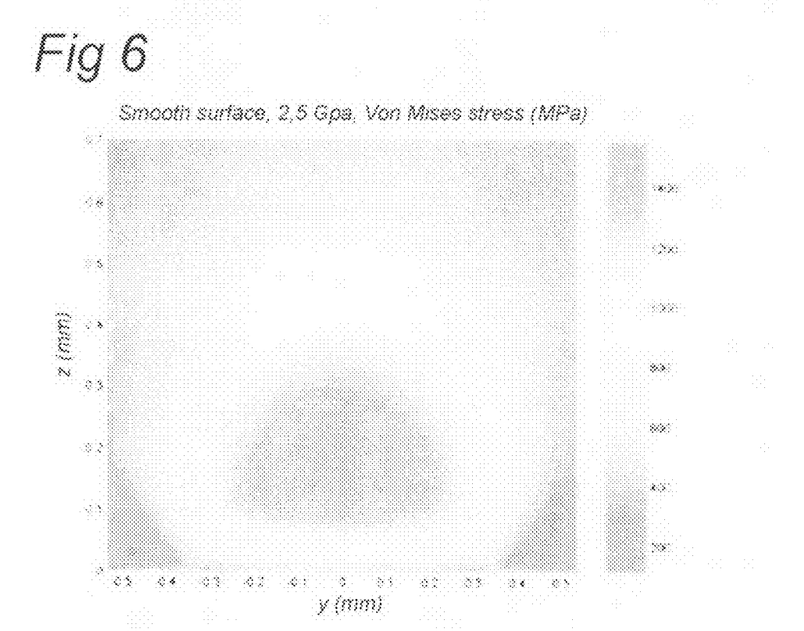
FIG. 6 shows the Von Mises stress field for a smooth surface in a Hertzian contact.
Figure 7:
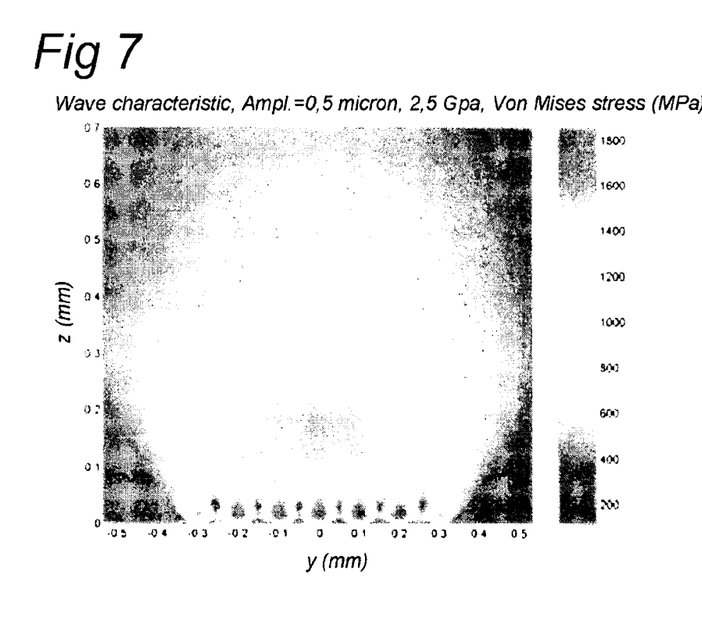
FIG. 7 shows a similar graph for a surface obtained by means of the method according to the invention.

At a greater depth under the surface the fatigue integral shows smaller values for the SPS surface, shown in FIG. 7, in comparison to the surface of FIG. 6. Thus the life of the SPS surface will be extended. The smaller values in question are caused by an extension of the apparent area of contact for the SPS-surface. This apparent area of contact has to increase for a surface in which the load is carried only by the ridges, so as to fulfil the equilibrium between load and stress times area of contact. Consequently, the sub-surface stresses are reduced which is shown in table 3 and FIG. 8.

TABLE 3

Table 3, contact areas for all calculate cases calculated on a grid of (513 × 513 nodes).

| Load c (GPa) | Load (N) | Roughness μm | Real area mm² | Apparent area mm² |
|---|---|---|---|---|
| 2.5 | 664.7 | Ra = 0 | 0.164 | 0.164 |
| | 664.7 | Ra = 0.32 | 0.0995 | 0.174 |
| | 664.7 | Ra = 0.64 | 0.0673 | 0.177 |

TABLE 3-continued

Table 3, contact areas for all calculate cases calculated on a grid of (513 × 513 nodes).

| Load c (GPa) | Load (N) | Roughness μm | Real area mm² | Apparent area mm² |
|---|---|---|---|---|
| 2.0 | 340.3 | Ra = 0 | 0.256 | 0.256 |
| | 340.3 | Ra = 0.32 | 0.187 | 0.300 |
| | 340.3 | Ra = 0.64 | 0.118 | 0.311 |
| 1.6 | 174.2 | Ra = 0 | 0.400 | 0.400 |
| | 174.2 | Ra = 0.32 | 0.330 | 0.393 |
| | 174.3 | Ra = 0.64 | 0.203 | 0.493 |

Figure 8:
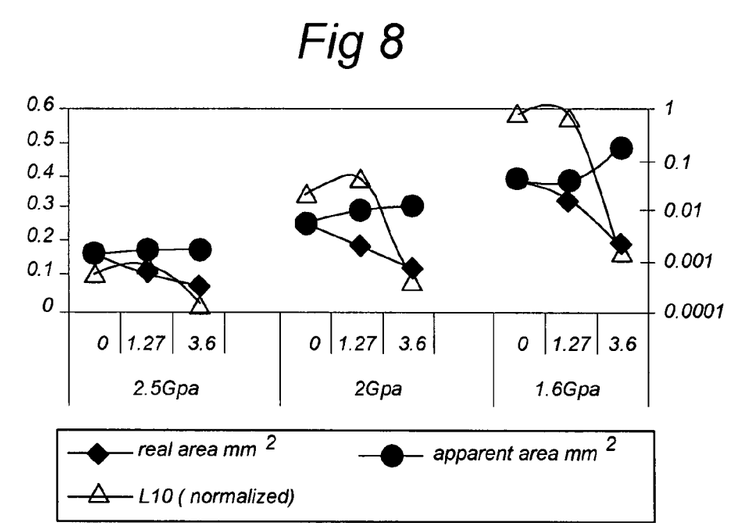
FIG. 8 shows the relative life as function of the feed-rate applied during the ball calendering process.

FIG. 8 shows the real and the apparent surface areas plotted of a function of the $\Delta q$ value of the surface for three different load levels. It can be seen that the bearing life L10 is a function of the asperity slopes. The respective $\Delta q$ values correspond to a feed rate of 25, 50 and 100 microns per second. The apparent area of contact increases by increasing the roughness. On the other hand, the real area of contact decreases by increasing the roughness (see also FIGS. 4 and 5). By increasing the roughness, the asperity ridges take over the load from the values. As a result a real area of contact will decrease. Fatigue life calculations show that these two effects are almost in balance. As a result the fatigue life of highly loaded ideal SPS surfaces is equal or slightly higher than the mathematically smooth surfaces. For smaller loads, the life is even significantly increased.

It is also clear that this effect does not occur for all SPS surfaces. In case the surface slopes ($\Delta q$ values) are too high, also SPS surfaces show a reduction in bearing life L10.

Attention is now paid to the phenomenon that micro-plastic deformation changes the sub-surface residual stress field and will influence fatigue life. In the case SPS surfaces two operations exist that influence the residual stress field: the hard turning phase and the ball calendering phase. Hard turning may generate tensile or compressive stresses, whereas the ball calendering process will generate compressive stresses only. The final stress level is the result of the combination of the two processes. Measurements on the individual processes and the combination of the two are shown in FIG. 9.

Figure 9:
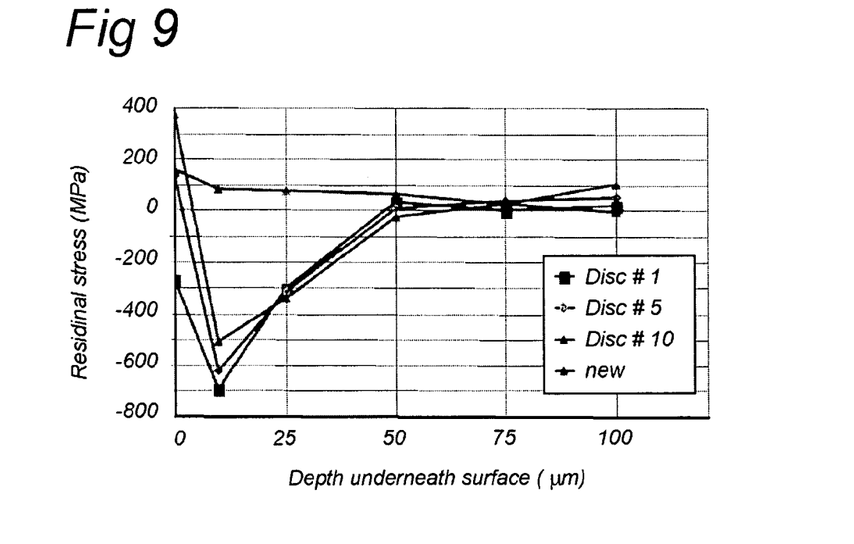
FIG. 9 shows the residual stresses as a function of the depth for subsequently manufactured test discs.

FIG. 9 shows a result of tests carried out on ten discs, with the aim of investigating the effect of tool wear on the development of residual stresses. The figure shows the residual stresses taken from the first, the fifth and tenth disc. This figure clearly shows the influence of tool wear on residual stress development. Tool wear results in tensile stresses near the surface. Thus, it is advisable to use fresh tool bits as much as possible.

Figure 10:
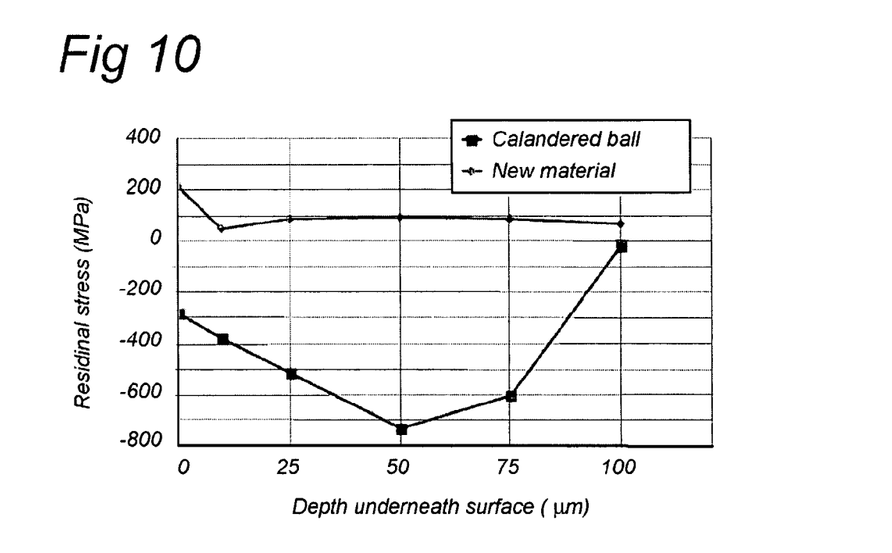
FIG. 10 shows the residual stresses before and after ball calendering.

FIG. 10 shows the influence of the level of the residual stresses that are induced by the ball calendering process only. A fresh surface, which has only been polished very gently after heat treatment, has been subjected to a ball calendering process. The results show that the residual stresses have been changed to compressive stresses up to a depth of 100 microns.

Figure 11:
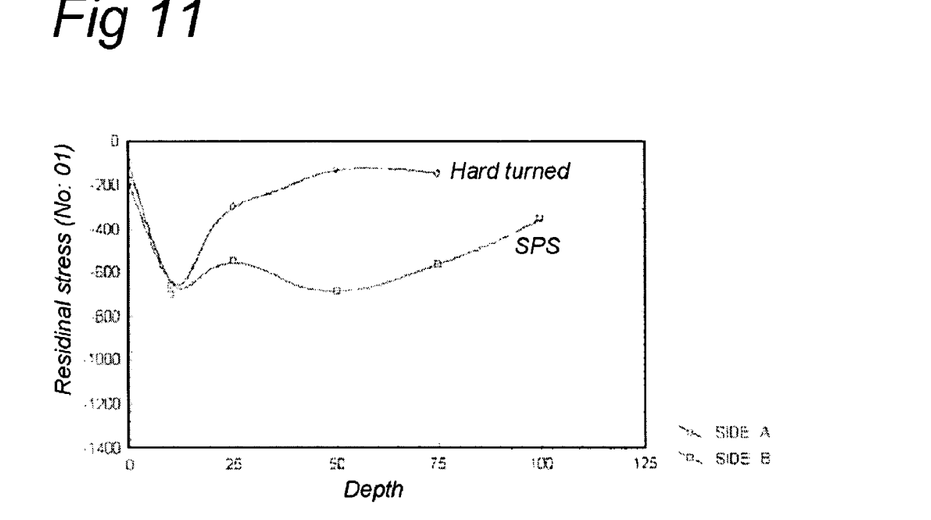
FIG. 11 shows the residual stress profile for a hard turned surface obtained according to the method of the invention.
Figure 12:
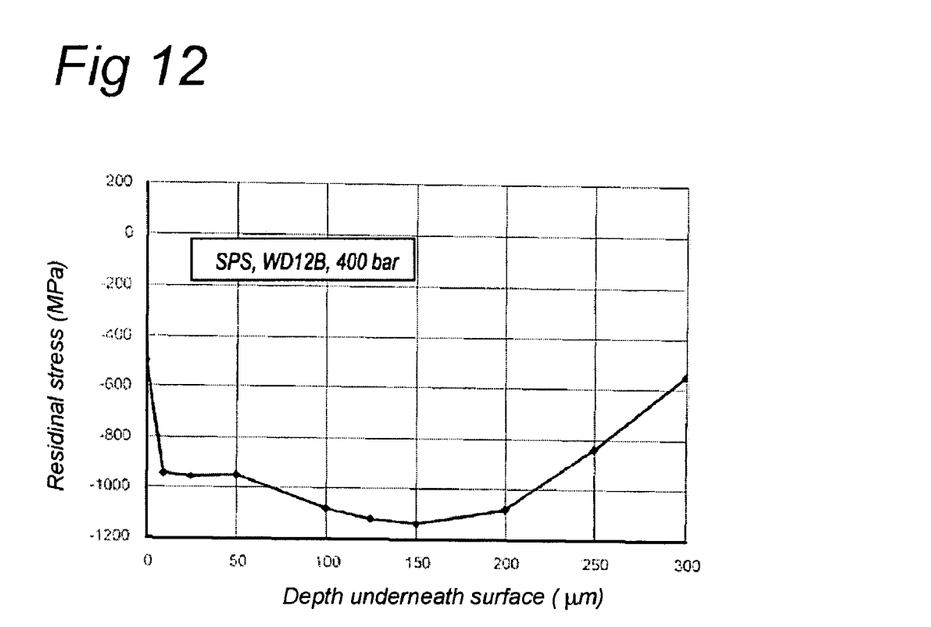
FIG. 12 shows the residual stress obtained in the case of a ball calendering pressure of 400 bar.

FIG. 11 shows the residual stress profile of a hard turned surface which has subsequently been subjected to the ball calendering process. A Bainitec hardened steel was used and a new hard turning tool. Although the SPS process affects the surface slightly, the main contribution is in the area deep under the surface. This experiment shows that the ball calendering process does not only change the stress level close to the surface, but also deeper beneath the surface there is also a major contribution. The stress levels can be influenced by pressure, feed rate and ball size. An example is shown in FIG. 12 for which a very high pressure has been applied. The residual stresses are very high throughout the depth.

Furthermore, lift-off speed has been calculated for the discs that have been manufactured with the SPS process. The lift-off speed is the minimum speed required to build up a fully separating lubricant film. It is used to qualify the surface performance in lubricated contacts. A good surface finish has a low lift-off speed, which means that the surface is able to build-up a film at already a low rotational speed.

Figure 13:
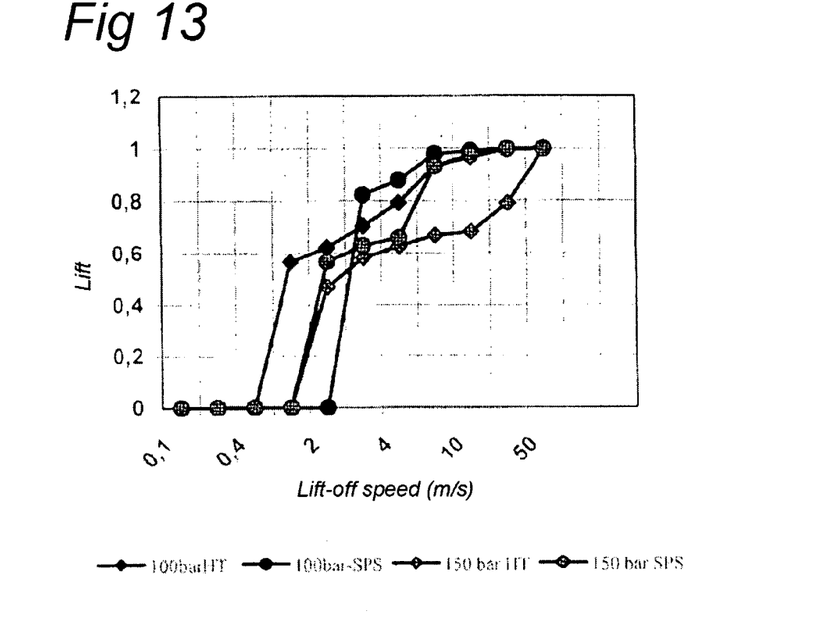
FIG. 13 shows the result of separation or lift-off calculations for a hard turned surface.
Figure 14:
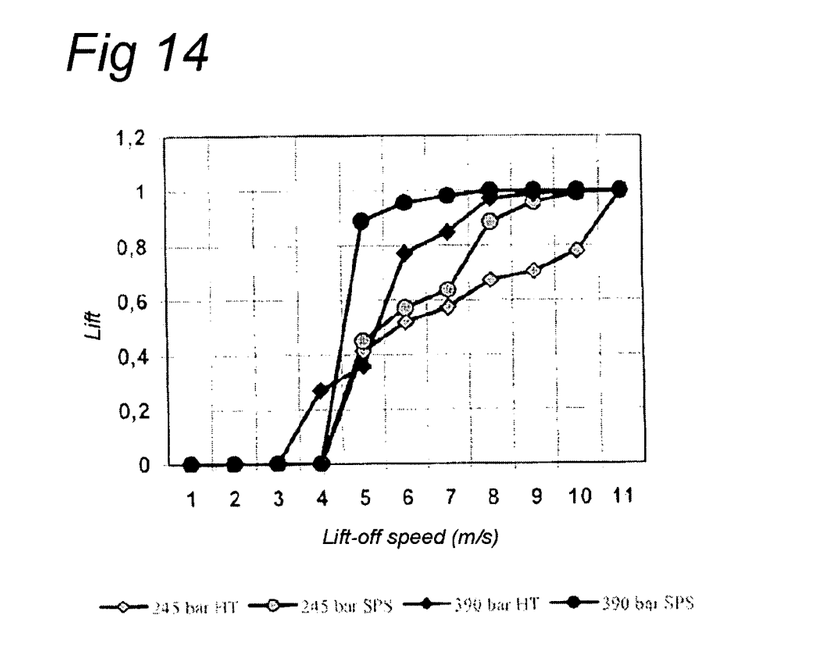
FIG. 14 shows the lift-off calculations for a surface obtained according to the method of the invention.

The lift-off curves have been calculated using reference measurements in the track just before the ball calendering process and just after the process, at proximately the same spots. Results are given in FIGS. 13 and 14, in which the hard turned surface structure has been labelled as "HT", and the ball calendered surface has been labelled as "SPS". The FIG.s show that the lift-off speed is not constant for the various hard turned surfaces. In all cases, the ball calendering process has reduced the lift-off speed.

Running-in is the process where the roughness is changing during bearing operation to a state where full separation is obtained. Usually the distinction is made between two stages: one phase where the asperities are plastically deformed, and a mild wear phase.

Figure 15:
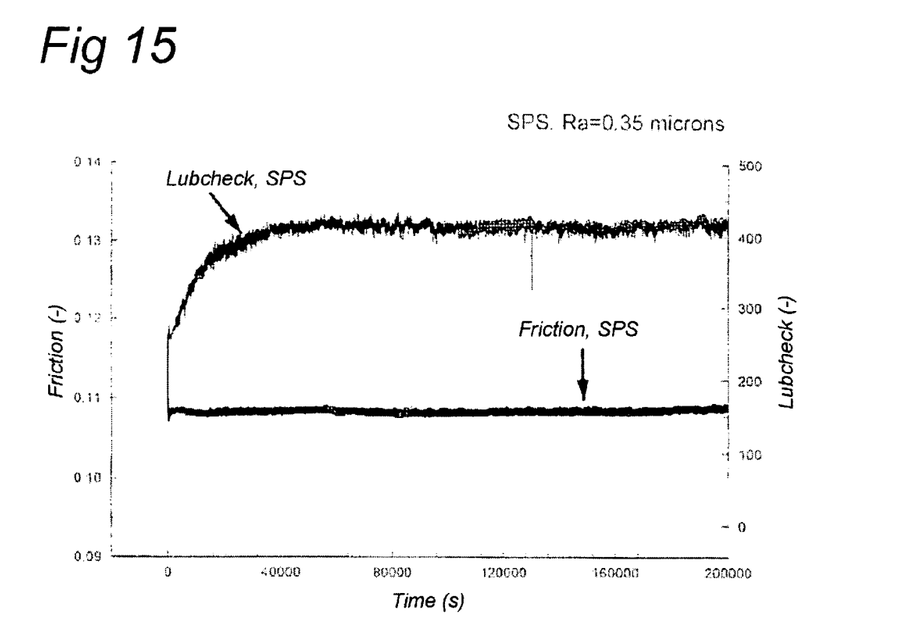
FIG. 15 shows a running-in experiment on a surface obtained with the process according to the invention, and a ground surface.

FIG. 15 shows the results of two running-in experiments. It is clear that the ground surface shows the traditional running-in behaviour. Initially, the friction signal changes rapidly in the first 50 minutes, after which a mild wear phase follows where the friction signal changes at a lower rate than before.

The SPS surface misses the first phase of plastic deformation. This is not surprising since this plastic deformation actually occurred during the ball calendering operation. Thus, the ball calendering operation can be regarded as running-in operation.

Figure 16:
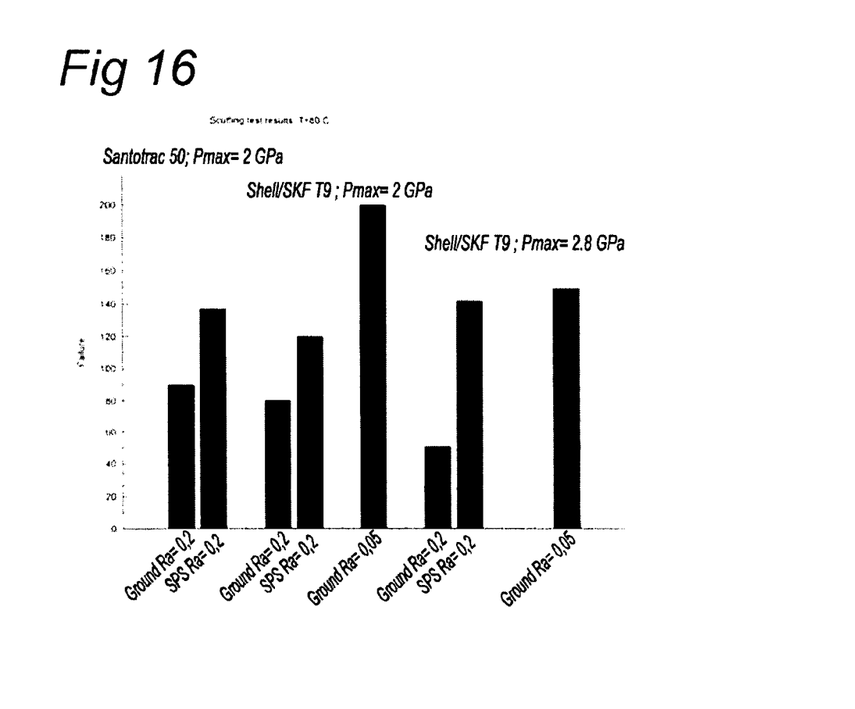
FIG. 16 shows the results of scuffing tests.

The results of the performance of ground and SPS surfaces are shown in FIG. 16. The scuffing resistance is related to adhesive wear, smearing, scuffing or galling. These phenomena typically occur under sliding operating conditions. To give an impression on the life performance during sliding, an accelerated test strategy has been developed.

FIG. 16 shows that the ultra smooth test surfaces (ground Ra=0,05) performed very well. Full separation by the lubricant film results in high scuffing resistance. The conventional rough surfaces, ground Ra=0,2 and ground Ra=0,1 show a bad performance for all lubricants and all loads. Compared to these ground surfaces, the SPS surfaces clearly behave much better despite the fact the reference thereof is higher.

The invention claimed is:

1. Method for treating the surface of a machine element, comprising the raceway and/or a rolling element of a rolling element bearing, comprising the steps of:
    hardening the surface of a machine element, comprising the raceway and/or a rolling element of a rolling element bearing,
    subjecting the hardened surface to a turning operation so as to obtain a specific roughness profile having a series of alternating ridges and grooves,
    after the turning operation subjecting the surface to a ball calendering operation so as to flatten the ridges of the roughness profile whereby a $\Delta q$ value smaller than 5° is obtained.

2. Method according to claim 1, whereby a $\Delta q$ value smaller than 20° is obtained.

3. Method according to claim 1, whereby a $\Delta q$ value greater than 1° is obtained.

4. Method according to claim 1, wherein the ball calendering operation is carried out by means of a ceramic ball.

5. Method according to claim 1, wherein the ball has a diameter of 2 to 13 mm.

6. Method according to claim 1, wherein the pressure applied by the ball on the surface amounts to a value from 50 to 400 bar.

7. Method according to claim 1, whereby the residual compressive stresses amount to maximally 800MPa.

8. Method according to claim 1, wherein the area with compressive stresses extends up to a depth of 500 micrometer under the surface.

9. Method according to claim 1, wherein a ball calendering tool is applied in which the ball is supported through a pressure medium the hydrostatic pressure of which ranges from 50 bar to 400 bar.

10. Method according to claim 1, wherein a sinusoidal-like surface is obtained.

11. Method according to claim 1, comprising the step of carrying out the turning operation and the ball calendering operation at the same feed rate.

12. Method according to claim 1, which comprises the steps of
rotating the machine element about an axis thereof,
moving a turning cutting tool along the surface of the rotating machine element parallel to the axis so as to carry out a cutting operation,
selecting a specific ratio of translational speed of the turning cutting tool and the rotational speed of the machine element,
subsequently moving a ball calendering tool along the surface of the rotating cut machine element parallel to the axis so as to carry out a ball calendering operation,
selecting a specific ratio of the translational speed of the ball calendering tool and the rotational speed of the machine element while carrying out the cutting operation which is the same as the specific ratio of the translational speed of the turning cutting tool and the rotational speed of the machine element while carrying out the cutting operation.

13. Method according to claim 1, wherein said machine element is of steel.

* * * * *